(12) United States Patent
Collier

(10) Patent No.: US 11,897,700 B2
(45) Date of Patent: Feb. 13, 2024

(54) SECONDARY BELT CLEANER WITH MODULAR, TORSIONAL TENSIONED ARM AND REPLACEABLE BLADE TIPS

(71) Applicant: ASGCO Manufacturing, Inc., Nazareth, PA (US)

(72) Inventor: Andrew M. Collier, Whitehall, PA (US)

(73) Assignee: ASGCO Manufacturing, Inc., Nazareth, PA (US)

( * ) Notice: Subject to any disclaimer, the term of this patent is extended or adjusted under 35 U.S.C. 154(b) by 0 days.

(21) Appl. No.: 17/714,554

(22) Filed: Apr. 6, 2022

(65) Prior Publication Data

US 2022/0227588 A1 Jul. 21, 2022

Related U.S. Application Data

(63) Continuation-in-part of application No. 17/084,909, filed on Oct. 30, 2020, now Pat. No. 11,345,552.

(Continued)

(51) Int. Cl.
*B65G 45/16* (2006.01)
*F16F 1/14* (2006.01)
(Continued)

(52) U.S. Cl.
CPC ............... *B65G 45/16* (2013.01); *F16F 1/14* (2013.01); *B65G 2207/26* (2013.01); *F16F 2224/0208* (2013.01)

(58) Field of Classification Search
None
See application file for complete search history.

(56) References Cited

U.S. PATENT DOCUMENTS 5,149,305 A 9/1992 Gordon
5,201,402 A 4/1993 Mott
(Continued)

FOREIGN PATENT DOCUMENTS

CN 201362503 Y 12/2009
WO WO 2012/019074 2/2012

OTHER PUBLICATIONS

"Razor-Back® Belt Cleaner, Mechanical Splices? No Problem.", ASGCO Manufacturing, Inc., 2021, retrieved on Feb. 2, 2021 from https://www.asgco.com/products/razor-back-conveyor-belt-cleaner/.

(Continued)

*Primary Examiner* — Kavel Singh
(74) *Attorney, Agent, or Firm* — Caesar Rivise, PC

(57) ABSTRACT

A secondary belt cleaner system for cleaning the surface of the return side of an endless conveyor belt. The system includes a plurality of blade devices that are rotatably biased against the return side surface using a respective torsion spring therein. Each blade device includes a head portion formed by a blade support and a replaceable blade tip that is releasably secured to the blade support. The head portion is connected to one end of a blade arm and the other end of the blade arm is coupled to a rotatable shaft inside a housing that is fixedly secured to a support shaft having mounting brackets at each end for mounting the system transversely to the conveyor belt frame. Adjacent blade devices have different blade arm lengths in order to have the blade coverage overlap with no gaps in between. Because these blade arm lengths are different and to maintain each blade tip in contact with the return side surface, the respective torsion springs in adjacent blade devices are pretensioned to different angular amounts.

11 Claims, 6 Drawing Sheets

Related U.S. Application Data

(60) Provisional application No. 62/936,866, filed on Nov. 18, 2019.

(51) Int. Cl.
 B65G 45/12 (2006.01)
 B65G 45/10 (2006.01)

(56) References Cited

U.S. PATENT DOCUMENTS

| | | | |
|---|---|---|---|
| 5,222,588 | A | 6/1993 | Gordon |
| 5,301,797 | A | 4/1994 | Hollyfield, Jr. et al. |
| 5,887,702 | A | 3/1999 | Mott |
| 5,950,803 | A | 9/1999 | Schwarze |
| 5,992,614 | A | 11/1999 | Mott |
| 6,443,294 | B1 | 9/2002 | Brody et al. |
| 6,843,363 | B2 | 1/2005 | Schwarze |
| 6,948,609 | B2 | 9/2005 | Finger et al. |
| 7,004,304 | B1 | 2/2006 | Smith et al. |
| 7,083,040 | B2 | 8/2006 | Finger et al. |
| 7,669,708 | B2 * | 3/2010 | Swinderman .......... B65G 45/16 198/502.1 |
| 8,485,344 | B1 * | 7/2013 | Liland .................... B65G 45/16 198/499 |
| 8,776,990 | B2 * | 7/2014 | Felton .................... B65G 45/16 198/499 |
| 9,016,462 | B2 | 4/2015 | Fries et al. |
| 9,469,484 | B2 * | 10/2016 | Kishor .................. B65G 45/16 |
| 9,517,493 | B2 | 12/2016 | Schwarze |
| 9,738,456 | B1 | 8/2017 | Grimm et al. |
| 9,828,188 | B2 | 11/2017 | Schwarze |
| 2004/0112716 | A1 | 6/2004 | DeVries et al. |
| 2016/0001329 | A1 | 1/2016 | Schwarze |

OTHER PUBLICATIONS

"Razor-Back MDX® Belt Cleaner, Designed For High Speed & Maximum Tonnage", ASGCO Manufacturing, Inc., 2021, retrieved on Feb. 2, 2021 from https://www.asgco.com/products/razorback-mdx-conveyor-belt-cleaner/.

"Retractable Razor-Back® System, System can be accessed and removed from outside the chute.", ASGCO Manufacturing, Inc., 2021, retrieved on Feb. 2, 2021 from https://www.asgco.com/products/retractable-razor-back-system/.

"TORO™ Reversing Belt Cleaner, Flexible Solution Suitable for Reversing Conveyor Belts", ASGCO Manufacturing, Inc., 2021, retrieved on Feb. 2, 2021 from https://www.asgco.com/products/toro-reversing-belt-cleaner/.

"U-Scrape™", ASGCO Manufacturing, Inc., 2021, retrieved on Feb. 2, 2021 from https://www.asgco.com/products/u-scrape/.

"Dry Wipe™ Belt Cleaner, Final Cleaner In A Cleaning System On Conveyor Belt", ASGCO Manufacturing, Inc., 2021, retrieved on Feb. 2, 2021 from https://www.asgco.com/products/dry-wipe-belt-cleaner/.

"Chevron Brush Cleaner™", ASGCO Manufacturing, Inc., 2021, retrieved on Feb. 2, 2021 from https://www.asgco.com/products/chevron-brush-belt-cleaner/.

"Chevron™ Disk Belt Cleaner, Speed and Force of Belt Rolling", ASGCO Manufacturing, Inc., 2021, retrieved on Feb. 2, 2021 from https://www.asgco.com/products/chevron-disk-belt-cleaner/.

"Wash Box™ Belt Cleaning System, Works on the Return Side of the Conveyor Belt", ASGCO Manufacturing, Inc., 2021, retrieved on Feb. 2, 2021 from https://www.asgco.com/products/wash-box-belt-cleaning-system/.

"Reversible Diagonal Plow, Designed to Discharge Fugitive Material From One Side of the Conveyor System", ASGCO Manufacturing, Inc., 2021, retrieved on Feb. 3, 2021 from https://www.asgco.com/products/reversible-diagonal-blow/.

"Replacement Blade Assembly for Richwood™ Cleaners, Retrofits the Richwood™ 1C or 3C Belt Cleaner!", ASGCO Manufacturing, Inc., 2021, retrieved on Feb. 2, 2021 from https://www.asgco.com/products/richwood-replacement-blade-assembly/.

International Search Report for related PCT Application No. PCT/US2020/060380 dated Mar. 3, 2021.

International Search report for related PCT Application No. PCT/US2020/067103 dated Apr. 9, 2021.

English abstract of CN201362503Y.

* cited by examiner

SECONDARY BELT CLEANER WITH MODULAR, TORSIONAL TENSIONED ARM AND REPLACEABLE BLADE TIPS

CROSS-REFERENCE TO RELATED APPLICATIONS

This Continuation-in-Part application claims the benefit under 35 U.S.C. § 120 of application Ser. No. 17/084,909 filed on Oct. 30, 2020 which in turn claims the benefit under 35 U.S.C. § 119(e) of Application Ser. No. 62/936,866 filed on Nov. 18, 2019, and all of which are entitled SECONDARY BELT CLEANER WITH MODULAR, TORSIONAL TENSIONED ARM AND REPLACEABLE BLADE TIPS and all of whose entire disclosures are incorporated by reference herein.

BACKGROUND OF THE INVENTION

The present invention relates to a blade of a conveyor belt scraper that contacts the conveyor belt surface, and more particularly, to a belt cleaner that cleans the surface on the return side of a conveyor belt after the conveyor belt payload has been discharged.

Cleaning devices that are installed to clean the return side of a conveyor belt are referred to as "secondary belt cleaners." These cleaning devices typically comprise a torsionally-tensioned cleaning arm to permit relief for any large material that gets between the cleaning element and the return side of the conveyor belt. In many of these cleaning devices, a rubber or urethane tensioning element is used with the cleaning arm. Moreover, the cleaning element portion of the cleaning arm is molded into the cleaning arm.

However, rubber or urethane tensioning elements (or other "ROSTA" (viz., rubber suspension, oscillating and tensioning) style components) in these conventional secondary belt cleaners are susceptible to performance changes as the temperature rises and falls. Another drawback of these conventional secondary belt cleaners is that when the cleaning element becomes worn, the entire cleaning device requires replacement thereby greatly increasing the rebuild costs.

Thus, there remains a need for a secondary belt cleaner that is greatly insensitive to temperature changes and which permits only a cleaner blade portion to be replaced when the blade portion becomes worn.

All references cited herein are incorporated herein by reference in their entireties.

BRIEF SUMMARY OF THE INVENTION

A secondary belt cleaning system for cleaning the return side surface of an endless conveyor belt is disclosed. The secondary belt cleaning system comprises: a plurality of blade devices mounted to a support shaft having mounting brackets at each end of the support shaft in order to configure the plurality of blade devices to be transversely positioned against the return side surface of the conveyor belt; each one of the plurality of blade devices comprising a torsion spring (e.g., stainless steel torsion spring) to rotatably bias a replaceable blade tip (e.g., a carbide blade tip) against the return surface of the conveyor belt.

A method of cleaning the surface of the return side of an endless conveyor belt is disclosed. The method comprises: providing a plurality of blade devices mounted to a support shaft having mounting brackets at each end of the support shaft in order to configure the plurality of blade devices to be transversely positioned against the return side surface of the conveyor belt; and rotatably biasing a replaceable blade tip (e.g., a carbide blade tip) of each one of the plurality of blade devices against the return side surface of the conveyor belt by pretensioning a respective torsion spring (e.g., stainless steel torsion spring) within respective blade devices.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
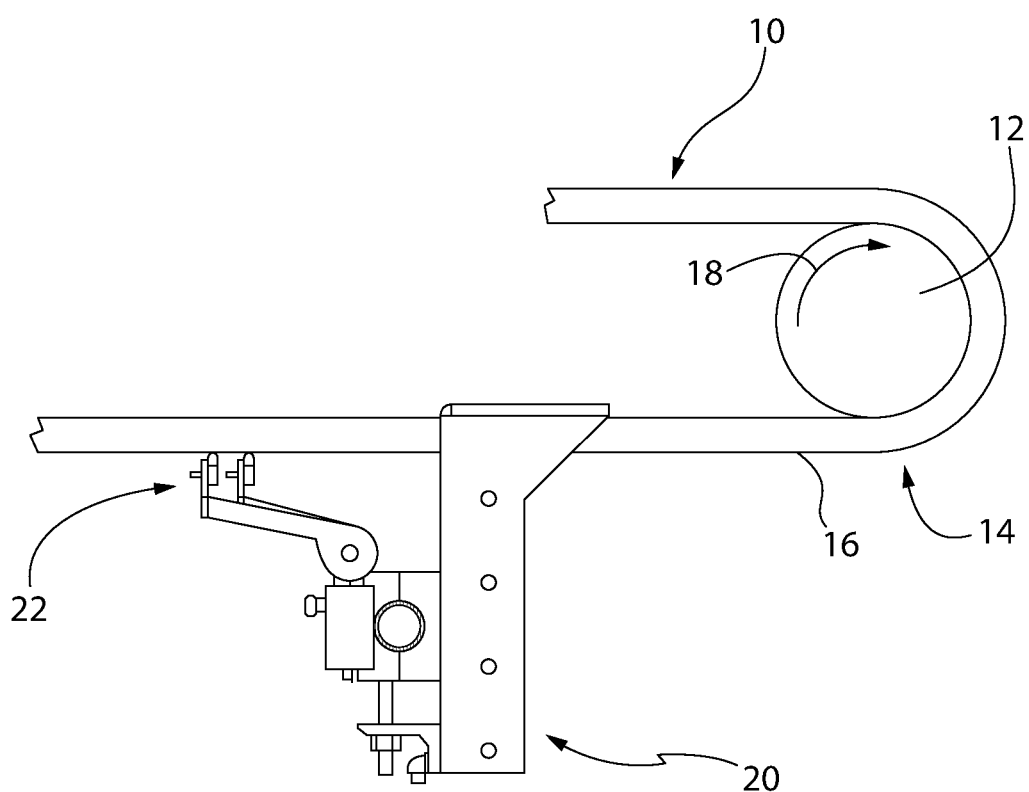
FIG. 1 is a partial side view of a conveyor belt system showing the secondary belt cleaner system of the present invention installed thereat.

Referring now to the figures, wherein like reference numerals represent like parts throughout the several views, exemplary embodiments of the present disclosure will be described in detail.

Throughout this description, various components may be identified having specific values, these values are provided as exemplary embodiments and should not be limiting of various concepts of the present invention as many comparable sizes and/or values may be implemented.

As shown in FIG. 1, the secondary belt cleaner system 20 is positioned underneath the return side 14 of the conveyor belt 10, in a position that is transverse to the conveyor belt motion, and wherein the head portion of a plurality of blade devices 22 are in contact with the outer surface 16 of the return side 14 of the conveyor belt 10 as a head pulley 12 moves the conveyor belt 10 in the direction indicated by arrow 18.

Figure 2:
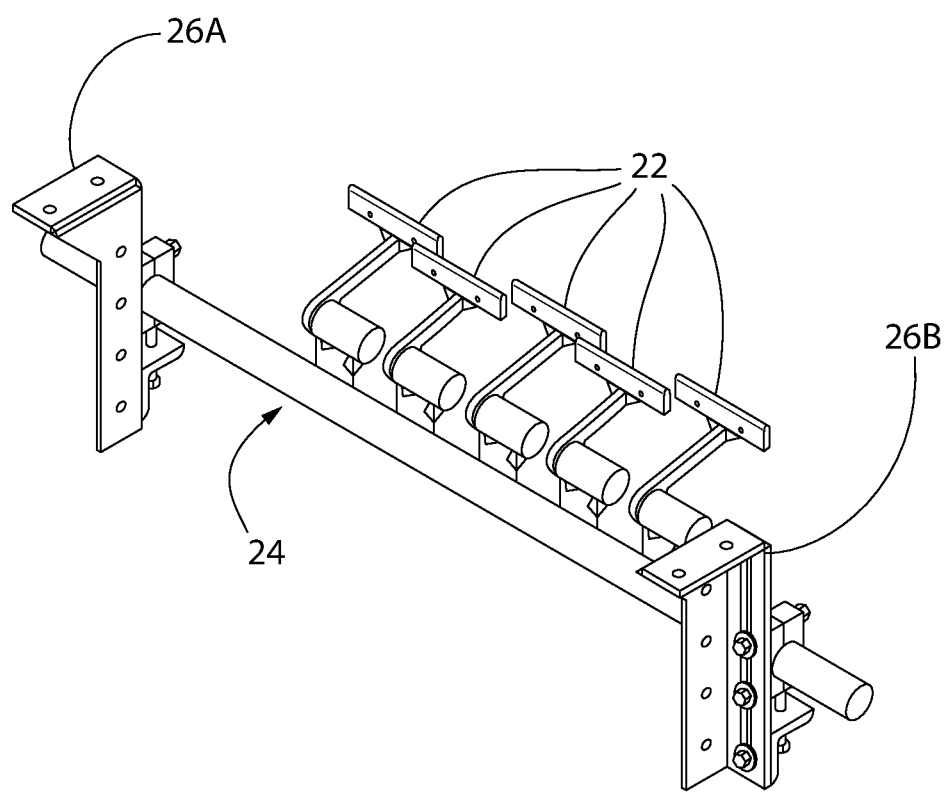
FIG. 2 is an isometric view of the secondary belt cleaner system of FIG. 1.
Figure 3A:
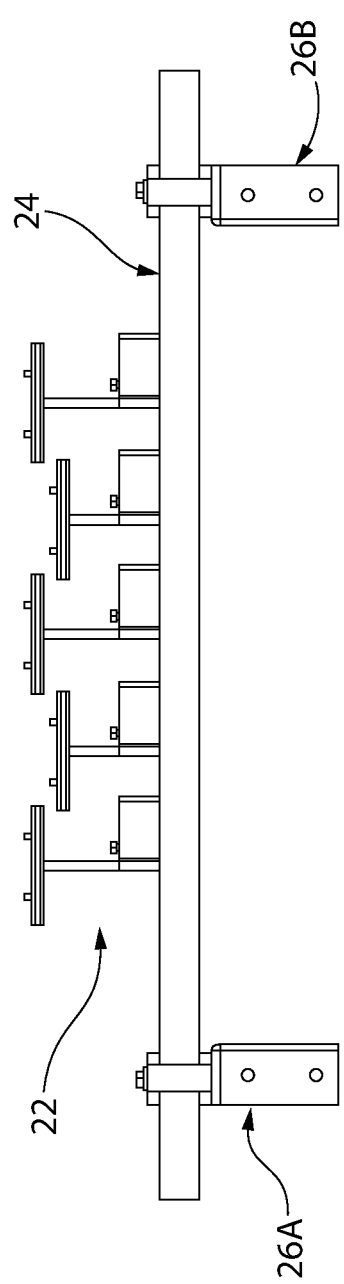
FIG. 3A is a top plan view of the secondary belt cleaner system of FIG. 1.
Figure 3B:
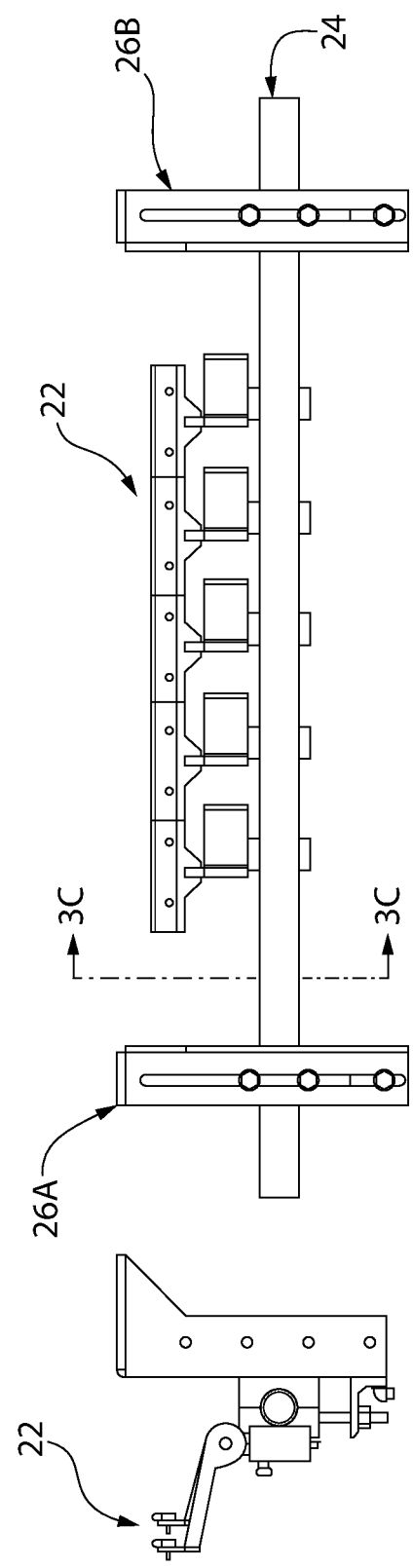
FIG. 3B a back plan view of the secondary belt cleaner system of FIG. 1.
Figure 3C:
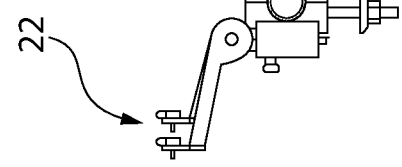
FIG. 3C is a side view of the secondary belt cleaner system taken along line 3C-3C of FIG. 3B.

FIG. 2 is an isometric view of the secondary belt cleaner system 20 showing the plurality of blade devices 22 mounted to a support shaft 24 whose ends are releasably secured in respective mounting brackets 26A and 26B; these brackets 26A/26B permit the system 20 to be mounted to the conveyor belt system (not shown) in the orientation shown in FIG. 1. FIGS. 3A-3C provide different views of the secondary belt cleaner system 20.

Figure 4A:
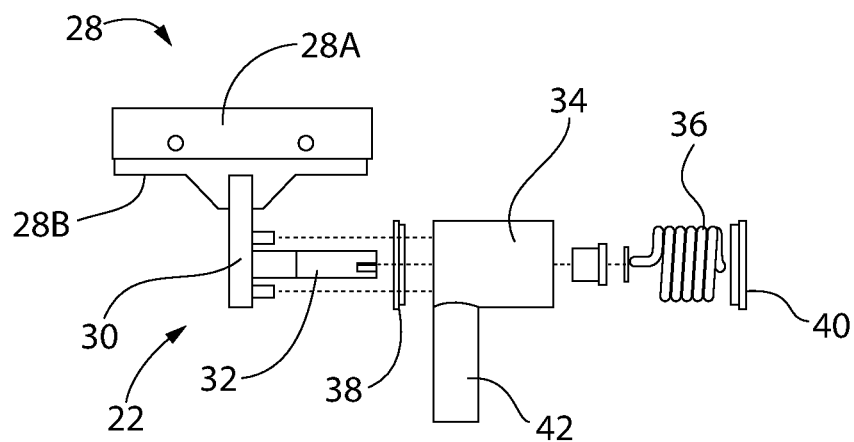
FIG. 4A is an exploded front view of the blade device of the secondary belt cleaner system of the present invention.
Figure 4B:
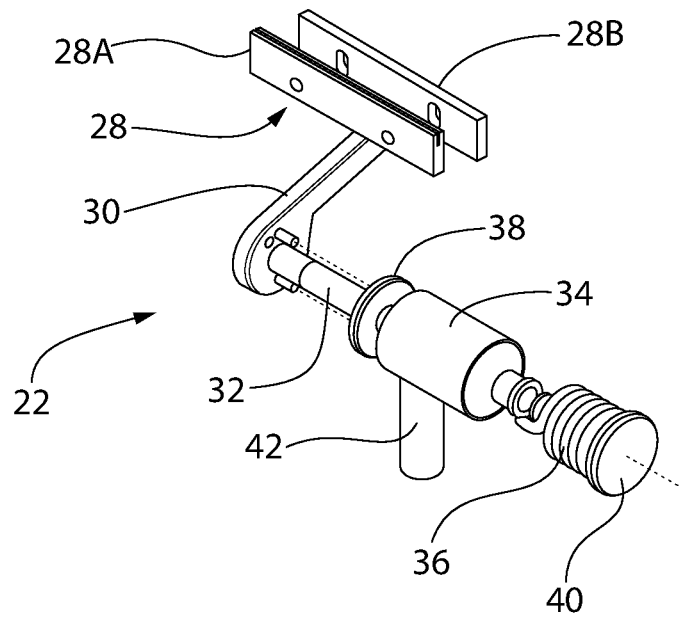
FIG. 4B is an exploded isometric view of the blade device of the secondary belt cleaner of the present invention.

As shown in FIGS. 4A-4B, each blade device 22 includes a head portion 28 that comprises a replaceable blade tip 28A releasably secured (e.g., using a fastener such as a screw, rivet, etc.) to a blade support 28B. The blade support 28B is integrated on one end of a blade arm 30 while the other end of the blade arm 30 is coupled to a rotatable shaft 32. The other end of the shaft 32 is positioned inside a hollow cylindrical housing 34 wherein a torsion spring 36 connects with the other end of the shaft 32. A bushing 38 (e.g., ultra-high molecular weight polyethylene, etc.), concentrically located on the shaft 32, closes off one side of the housing 34 while an end cap 40, coupled to one end of the torsion spring 36, closes off the other side of the housing 34. The housing 34 is fixedly secured on the support shaft 24 via housing strut 42. As such, the head portion 28 is thus rotatably biased against the surface 16 of the return side 14 of the conveyor belt 10 when the system 20 is installed thereat. The replaceable blade tip 28A may comprise a carbide material and the torsion spring 36 may comprise stainless steel.

Figure 5A:
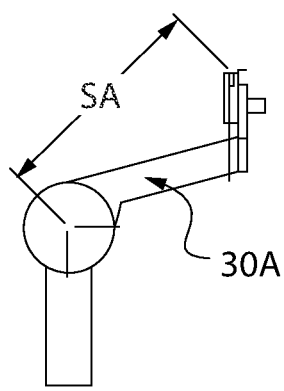
FIG. 5A is a side view functional diagram of the shorter (SA) blade arm.
Figure 5B:
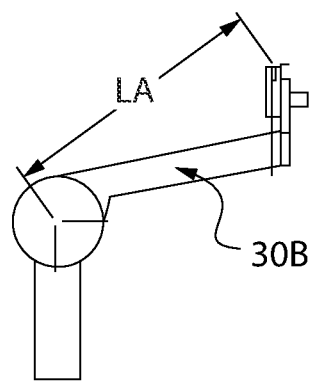
FIG. 5B is a side view functional diagram of the longer (LA) blade arm.

It should be noted from FIGS. 2 and 3A that the head portions 28 of the blade devices 22 are staggered, i.e., they do not form a single line from one end of the support shaft 24 to the other. This is to ensure that the blade tip 28A coverage overlaps and that there is no gap in between the blade tips 28A. This achieved by using different blade arm 30 lengths for alternate blade devices 22; see FIGS. 5A and 5B which are side view functional diagrams of the shorter (SA) blade arm 30A and the longer (LA) blade arm 30B, respectively. However, in order to ensure that each blade tip 28A is in contact with the surface 16 of the return side 14 of the conveyor belt 10, the torsion spring 36 for particular blade devices 22 are pretensioned differently. By way of example only, the shorter blade arm 30A is pretensioned to 10° with respect to a longitudinal axis of the rotatable shaft 32 while the longer blade arm 30 is pretensioned to 15° with respect to a longitudinal axis of the rotatable shaft 32. As such, the tops of the blade tips 28A are aligned, as shown most clearly in FIG. 3C.

In operation, the torsion spring 36 provides a bias to maintain the blade tip 28A against the surface 16 of the return side 14 of the conveyor belt 10. Should any large object adhering to the surface 16 be encountered by the tip 28A, the blade arm 30 will pivot in the direction of the conveyor motion 18 (FIG. 1) to provide relief thereto. Moreover, because the torsion spring 36 comprises stainless steel, it is largely insensitive to temperature changes. Furthermore, if the blade tip 28A becomes worn, it is only necessary to remove the blade tip 28 from the blade support 28B (e.g., by removing fasteners (not shown) from the apertures shown in FIGS. 4A-4B) and to replace it with another new blade tip 28A; all other components of the blade device 22 are unaffected. This allows for a quick onsite rebuild.

Figure 6:
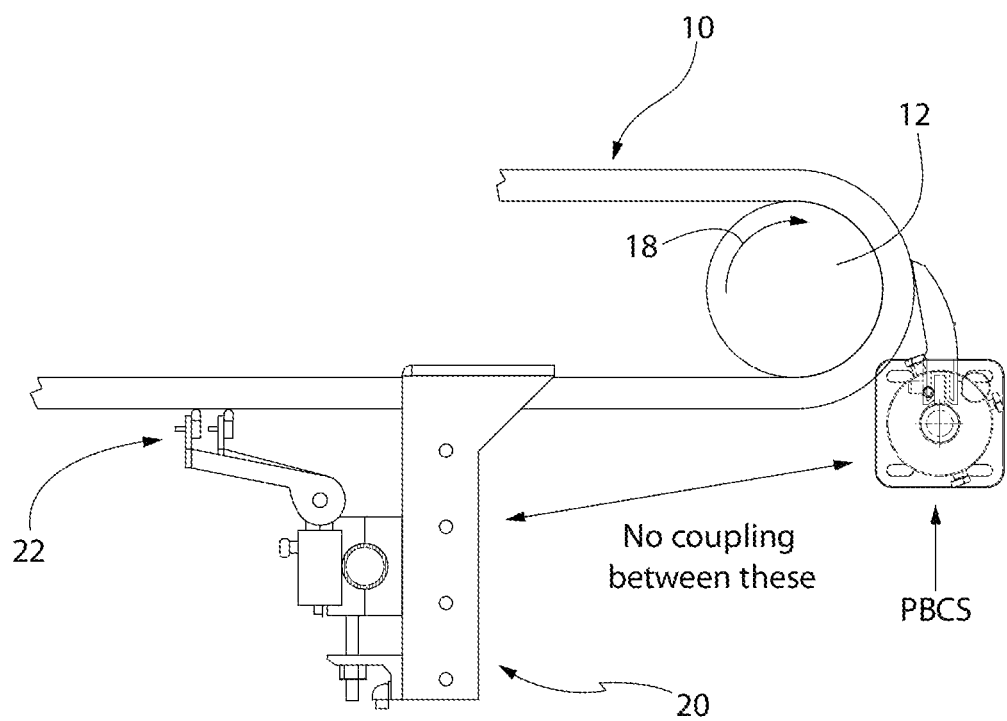
FIG. 6 is similar to FIG. 1 but in addition shows the location of a primary belt cleaning system (PBCS) that is not coupled to the secondary belt cleaning system of the present invention.

FIG. 6 is similar to FIG. 1 but now also shows a primary belt cleaner system PBCS used in conjunction with the secondary belt cleaning system 20 of the present invention. The PBCS cleans the payload delivery side of the conveyor belt 10, whereas the secondary belt cleaning system 20 cleans the return side 14 of the conveyor belt 10. As shown in FIG. 6, there is no coupling between the PBCS and the secondary belt cleaner system 20 of the present invention. Since there is no coupling of these two systems together, to replace any of the blade tips 28A of the secondary belt cleaner system 20 does not require the use of any load plates or other mechanisms for displacing both the PBCS and the secondary belt cleaner system 20 just in order to replace any of the blade tips 28A. As such, there is no need to displace any portion of the PBCS to replace any of the blade tips 28A.

In contrast, in U.S. Pat. No. 8,776,990 (Felton, et al.), because the belt cleaner assembly 140 and the secondary belt cleaner assembly 150 are coupled together, applying forces to load plates 164 and 180 are required for displacing both the belt cleaner assembly 140 and the secondary belt cleaner assembly 150 away from the conveyor belt 32 in order to replace any of the blades in the secondary belt cleaner assembly 150.

As such, the invention of the present application provides a more easy to use system for replacing any of the secondary cleaning system blade tips 28A.

While the invention has been described in detail and with reference to specific examples thereof, it will be apparent to one skilled in the art that various changes and modifications can be made therein without departing from the spirit and scope thereof.

What is claimed is:

1. A secondary belt cleaning system for cleaning the return side surface of an endless conveyor belt having a primary belt cleaning system, said secondary belt cleaning system comprising:
a plurality of blade devices mounted to a support shaft having mounting brackets at each end of said support shaft in order to configure said plurality of blade devices to be transversely positioned against the return side surface of the conveyor belt, each one of said plurality of blade devices being pivotable in the direction of conveyor belt movement for providing relief thereto, and wherein said plurality of blade devices are uncoupled to the primary belt cleaning system;
each one of said plurality of blade devices comprising:
a torsion spring contained within a housing and aligned with a rotatable shaft that is coupled to a blade support arm; and
a blade tip that is replaceable and which is coupled to said blade arm, said torsion spring rotatably biasing said replaceable blade tip of said blade device against the return surface of the conveyor belt.

2. The secondary belt cleaning system of claim 1 wherein said plurality of blade devices comprises blade arms of different lengths arranged alternately on said support shaft.

3. The secondary belt cleaning system of claim 2 wherein said torsion springs of said blade arms are pretensioned to different angular amounts depending on said lengths.

4. The secondary belt cleaning system of claim 1 wherein said torsion spring is stainless steel.

5. The secondary belt cleaning system of claim 1 wherein said replaceable blade tip comprises a carbide tip.

6. A method of cleaning the surface of the return side of an endless conveyor belt having a primary belt cleaning system and a secondary belt cleaning system, said secondary belt cleaning system cleaning a return side surface of the endless conveyor belt, said method comprising:
providing a plurality of blade devices for said secondary belt cleaning system mounted to a support shaft having mounting brackets at each end of said support shaft in order to configure said plurality of blade devices to be transversely positioned against the return side surface of the conveyor belt;
rotatably biasing a blade tip of each one of said plurality of blade devices against the return side surface of the conveyor belt by pretensioning a respective torsion spring within respective blade devices, each blade tip being replaceable such that only said blade tip requires replacement when said blade tip is worn;

positioning each of said respective torsion springs in a respective housing and aligning said respective torsion spring with a respective rotatable shaft that is coupled to a respective blade arm, and wherein said respective blade arm is coupled to a respective blade tip; and wherein said plurality of blade devices removable independently of any displacement of the primary belt cleaning system.

7. The method of claim 6 wherein said step of providing said plurality of blade devices includes forming each of said blade devices comprising:

forming a head portion by connecting said replaceable blade tip to said blade support;

coupling a blade arm at one end to said head portion and coupling the other end of said blade arm to a first end of said rotatable shaft; and coupling a second end of said rotatable shaft, opposite said first end, with said torsion spring inside said housing that is fixedly secured to the support shaft.

8. The method of claim 7 wherein said step of coupling said blade arm comprises coupling a blade arm of a first length between said head portion and said rotatable shaft for a first blade device and coupling a blade arm of a second length, different from said first length, between said head portion and said rotatable shaft for a second blade device positioned adjacent to said first blade device.

9. The method of claim 8 wherein said step of coupling said second end of said rotatable shaft comprises pretensioning said torsion springs of said first blade device and said second blade device to different angular amounts.

10. The method of claim 6 wherein said torsion spring is stainless steel.

11. The method of claim 6 wherein said replaceable blade tip comprises a carbide tip.

* * * * *